UNITED STATES PATENT OFFICE.

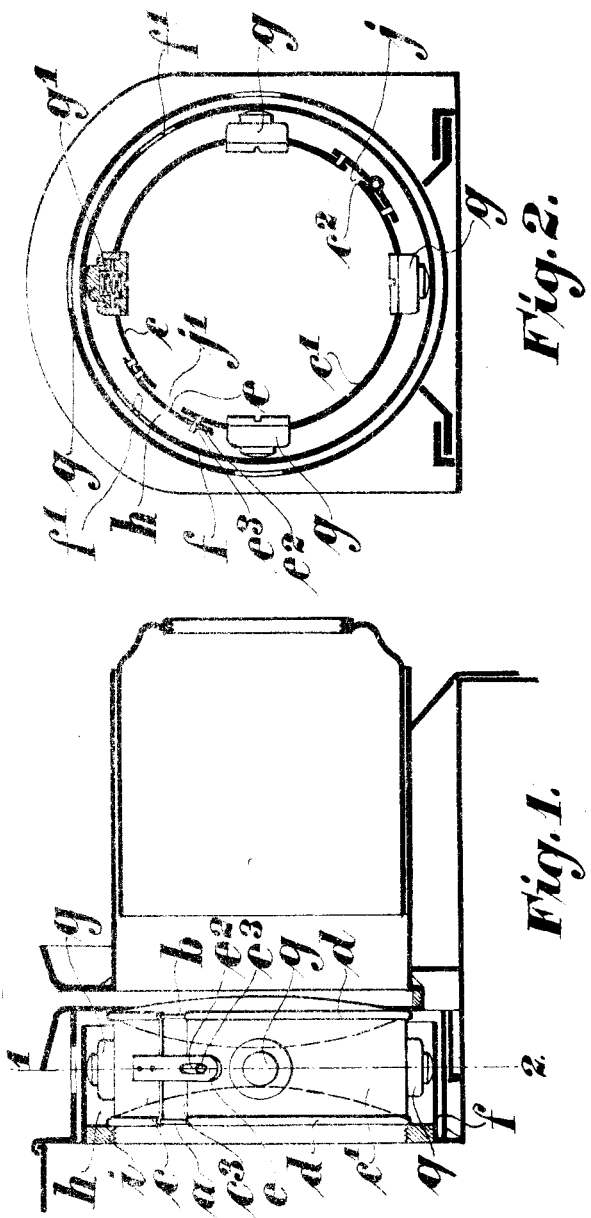

ROBERT A. OLDFIELD, OF BORDESLEY, BIRMINGHAM, ENGLAND.

MOUNT FOR LENSES, MIRRORS, AND THE LIKE.

1,057,262.
Specification of Letters Patent. Patented Mar. 25, 1913.
Application filed October 9, 1911. Serial No. 653,740.

*To all whom it may concern:*

Be it known that I, ROBERT ALEXANDER OLDFIELD, a subject of the King of Great Britain, residing at Refulgent Works, Warwick Street, Bordesley, Birmingham, in the county of Warwick, England, have invented certain new and useful Improvements in Mounts for Lenses, Mirrors, and the Like, (for which I have applied for Letters Patent in Great Britain, Patent No. 14,361, dated June 16, 1911,) of which the following is a specification.

This invention comprises improvements in or relating to lenses, condensers, reflectors and other such glass or similar articles or bodies used in connection with or in relation to means of illumination, and it has for various of its several purposes to avoid breakage of the lenses or mirrors by the heat, as also to provide greater accessibility which is of advantage both in the process of manufacture and when in use.

In connection with condensers for instance such as are used in magic lanterns or kinematograph apparatus, it has been the practice to mount the two lenses of the condenser in a metallic case or cylinder which is placed in position in the apparatus. Where, as is very frequently the case such an apparatus is provided with an arc light, considerable heat is, as will be well understood, generated in the vicinity of the condenser; the casing of the condenser lenses expands rapidly being of metal and the lenses themselves afterward expand more slowly until they occupy the entire diameter of the expanded casing. When the light is removed the condenser casing, cooling more quickly than the glass, contracts and crushes the glass so to speak, this frequently resulting in the glass being cracked or broken. All efforts which have to my knowledge been directed with a view to the avoidance of this cracking or breaking of the glass by the heat, have been directed to systems of ventilation in connection with or in relation to the lenses thereby to prevent the latter from becoming over-heated. But the temperature of an arc being very high it is impossible by these means to satisfactorily overcome the difficulty and where cool air is freely circulated around or in relation to the glass, the latter is frequently cracked or broken by reason of its being unable to internally withstand the unequal expansion or contraction resultant upon the variation or irregularity of the surrounding temperature.

The present invention has for its purpose to remove the various difficulties heretofore encountered and to introduce a mode of and means for mounting or installing such glass articles whereby they are efficiently preserved from breakage notwithstanding the circumstances of temperature to which they are subjected.

By my invention the means by which the glass lens or other article is supported are of a resilient character adapted to accommodate themselves to the expansion and contraction while they are moreover of such a character that the lens can be detached or removed in a far simpler and convenient manner than has heretofore been the case.

In order that this invention may be clearly understood and more readily carried into practice, reference may be had to the appended explanatory sheet of drawings, upon which:—

Figure 1 is a sectional side elevation of a magic lantern showing my improvements in conjunction therewith. Fig. 2 is a sectional front elevation taken on plane 1, 2 of Fig. 1. Fig. 3 illustrates the composite cylinder hereinafter referred to, the drawings showing the parts thereof in the open position in which the lenses may readily be removed.

In a convenient embodiment of this invention described in its application to a condenser as used for instance in kinematograph apparatus, the two lenses $a$, $b$ of the condenser instead of being secured within a unitary cylinder, as has previously been the case, are mounted in a cylinder which however is formed in two halves or semi-circles $c$, $c^1$ hinged together at their one extremities at $c^2$ so that they can be closed around the lenses $a$, $b$ and fastened at their other extremities at $c^3$ to support the lenses $a$, $b$ and retain them in the desired relation to each other. At each edge of the cylinder an internal recess $d$ is provided adapted to receive one of the lenses $a$, $b$ so that one lens is disposed at each end of the short cylinder $c$, $c^1$. The clip for securing the two free ends of the semi-circular sections $c$, $c^1$ together is in the nature of a spring tongue $e$ on the one section $c$ having a perforation $e^2$ which is adapted to receive a stud $e^3$ on the other section $c^1$. The perforation $e^2$ is however elongated longitudinally of the tongue $e$ so that when the two sections $c$, $c^1$ are clipped together they nevertheless have a small play to and from each other permitting of the expansion of the lenses $a$, $b$.

The composite cylinder $c$, $c^1$ is adapted to be disposed in a similar but larger cylinder $f$ provided upon the apparatus. If the composite cylinder $c$, $c^1$ fitted tightly within the cylinder $f$ of the apparatus, the provision of the elongated slot $e^2$ for expansion would be to no purpose as expansion would be prevented by the outer cylinder $f$. A resilient means of supporting the composite cylinder $c$, $c^1$ within the outer cylinder $f$ is therefore provided conveniently consisting of four or any suitable number of spring puppets $g$ in the nature of projections mounted upon and radiating from the outer surface of the composite cylinder $c$, $c^1$ and which projections $g$ butt against the inner surface of the outer cylinder $f$. The projections being provided with springs $g^1$ may be depressed and they are advantageously in a constrained condition when the composite cylinder $c$, $c^1$ is in place so that when said composite cylinder $c$, $c^1$ expands with the lenses $a$, $b$, this is accommodated for by the spring studs $g$ being depressed more and more toward the center of the cylinder $c$, $c^1$.

The annular intermediate space $h$ between the inner cylinder $c$, $c^1$ and the outer cylinder $f$ is conveniently closed at the rear (i. e. the end nearest the light) by a ring or flange $i$ provided upon the apparatus, and at the front, the said space is in like manner substantially closed up by any suitable arrangement. It may however be desirable to have a certain amount of ventilating air circulating in between the cylinders $c$, $c^1$ and $f$; this may enter at the front or it may enter through holes $f^1$ around the circumference of the outer cylinder $f$. At the point at which the two sections of the composite cylinder are hinged together a space $j$ is left, a similar space $j^1$ being left at the point at which they are clipped or secured, these spaces permitting of circulation of the air or ventilation between the lenses $a$, $b$.

If any moisture should at any time condense upon the inner or adjacent surface of the lenses it will be understood that it is quite a simple matter to remove the condenser, gain access to the lenses, clean them and replace them in the apparatus.

The use of spring puppets $g$ around the composite cylinder $c$, $c^1$ may be departed from as the said puppets may be replaced by any suitable form of spring arrangement efficiently supporting the condenser and at the same time permitting of its expansion and contraction. Where spring puppets are employed however, they may each take the form of a small casing containing a spring plunger which latter by a shoulder is prevented from being entirely pushed out and in which the spring $g^1$ is entirely inclosed in the casing as shown in Fig. 2.

The present invention has considerable advantage in its application to articles such as glass reflectors, as for instance in the case of a mangin mirror. With these mirrors as is well understood the best results are obtained by placing the light as closely as possible to the mirror and where electric filament lamps are employed, maximum use is made of this advantage. But where the means of illumination have been, as for instance by the combustion of acetylene, the heat generated does not permit of the light being placed close up to the mirror by reason of the breakages which occur on account of the heat. Now by the present invention it is possible to place the illuminating flame much more closely to the reflector without danger and thus considerable increase in the illuminating power of the lamp is attained.

In a convenient embodiment of the present invention as applied to a mangin mirror, the latter is provided around its circumference with four or any suitable number of peripheral recesses into which recesses spring puppets or spring mounted points, provided upon the lamp casing are adapted to project. The mirror is thus suspended or retained in position by the said spring points or projections and any expansion or contraction is accommodated for by virtue of the radial movement of which the points are capable. Where the facial edge of the mirror is cylindrical, a casing in two halves somewhat similar to that aforedescribed may be provided around the mirror, the halves of the casing however being preferably secured independently by gripping or curling around the edge of the mirror. In this application the plunger of the puppet may have a screw stem by which it is secured to the lamp casing in which case the casing of the puppets is adapted to be displaceable and to project into a suitable aperture in the facial periphery of the mirror.

It will be understood that in addition to the advantages of better illumination, the present invention as applied to reflectors has further the advantage of providing a convenient means by which the reflector may be detached from the lamp for cleaning or other purposes.

What I claim as my invention and desire to secure by Letters Patent is:—

1. A mount for lenses, mirrors or the like comprising a casing, an expansible carrying ring, a series of spring members disposed at intervals around the circumference of said inner ring, and adapted to bear against the inner side of said casing and providing for the radial enlargement or expansion of said carrying ring as and for the purpose specified.

2. A mount for lenses, mirrors or the like comprising a casing, an expansible carrying ring, a series of spring-pressed sliding members disposed at intervals around the circumference of said carrying ring, and adapted to bear against the inner side of said casing, and fastening means for said carrying ring providing for radial expansion.

3. A mount for lenses, mirrors or the like, consisting of a casing, a carrying ring in two parts hingedly connected together, a series of spring-pressed sliding members disposed at intervals around the circumference of said inner ring, and slidable fastening means upon the meeting ends of said inner ring.

4. In a mount for lenses, mirrors or the like, a resiliently supported carrying ring, consisting of two semi-circular members hingedly secured together, a fastener upon one of said members and a projection upon the other member, the fastener having a slot slidably engaging said projection.

5. In a mount for lenses, mirrors or the like, a casing, a carrying ring consisting of two semi-circular members hingedly secured together, a fastener upon one of said members and a projection upon the other member, the fastener having a slot slidably engaging said projection, and spring-pressed sliding members adapted to resiliently support the carrying ring within the casing.

In witness whereof I have hereunto set my hand in the presence of two witnesses.

R. A. OLDFIELD.

Witnesses:
ROWLAND L. GOOLD,
HOLLIS F. BROWN.